United States Patent
Mauzy et al.

(10) Patent No.: US 7,426,029 B2
(45) Date of Patent: Sep. 16, 2008

(54) COLOR MEASUREMENT USING COMPACT DEVICE

(75) Inventors: Charles A Mauzy, Sammamish, WA (US); Michael D Stokes, Eagle, ID (US); Gary K. Starkweather, Bellevue, WA (US); Jonathan R. Schwartz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 11/217,070

(22) Filed: Aug. 31, 2005

(65) Prior Publication Data

US 2007/0046936 A1    Mar. 1, 2007

(51) Int. Cl.
*G01J 3/28* (2006.01)

(52) U.S. Cl. .................. 356/328; 356/326; 356/425; 356/402

(58) Field of Classification Search .......... 356/326, 356/328, 402–425, 334; 359/573
See application file for complete search history.

(56) References Cited

U.S. PATENT DOCUMENTS

| 5,107,332 | A |   | 4/1992  | Chan              |
|-----------|---|---|---------|-------------------|
| 5,185,673 | A |   | 2/1993  | Sobol             |
| 5,280,344 | A |   | 1/1994  | Witlin et al.     |
| 5,377,000 | A |   | 12/1994 | Berends           |
| 5,459,678 | A |   | 10/1995 | Feasey            |
| 5,483,339 | A |   | 1/1996  | Van Aken et al.   |
| 5,701,175 | A |   | 12/1997 | Kostizak et al.   |
| 5,757,536 | A | * | 5/1998  | Ricco et al. .................. 359/224 |
| 5,809,164 | A |   | 9/1998  | Hultgren, III     |
| 5,905,571 | A | * | 5/1999  | Butler et al. ................. 356/328 |
| 5,999,319 | A | * | 12/1999 | Castracane .................. 359/573 |
| 6,001,488 | A |   | 12/1999 | Kataoka et al.    |
| 6,023,557 | A |   | 2/2000  | Shaklee           |
| 6,262,804 | B1|   | 7/2001  | Friend et al.     |
| 6,416,153 | B1|   | 7/2002  | Pan et al.        |
| 6,459,425 | B1|   | 10/2002 | Holub et al.      |
| 6,525,721 | B1|   | 2/2003  | Thomas et al.     |
| 6,603,879 | B2|   | 8/2003  | Haikin et al.     |

(Continued)

FOREIGN PATENT DOCUMENTS

EP            0539943            5/1993

(Continued)

OTHER PUBLICATIONS

Corrigan, et al., "Silicon Light Machines—Grating Light Valve Technology Brief"; Jun. 2001 ver. C; 8 pages.

(Continued)

*Primary Examiner*—L. G Lauchman
(74) *Attorney, Agent, or Firm*—Lee & Hayes, PLLC

(57) ABSTRACT

Color measurement using compact devices is described herein. A color measurement device can include a diffraction grating that receives light reflected from a surface whose color is being measured. The diffraction grating is responsive to a control signal to split selected components from the reflected light and to admit the components in sequence to a sensor. The components can correspond to a selected wavelength or frequency of the reflected light. The sensor measures the energy or power level of each of the admitted components. The device can support determining a spectral representation of the color of the surface by generating output signals representing the various energy or power levels of each component of the light reflected from the surface.

17 Claims, 10 Drawing Sheets

U.S. PATENT DOCUMENTS

| | | | |
|---|---|---|---|
| 6,681,041 B1 | 1/2004 | Stokes et al. | |
| 6,704,442 B2 | 3/2004 | Haikin et al. | |
| 6,766,263 B1 | 7/2004 | Stokes | |
| 6,775,633 B2 | 8/2004 | Edge | |
| 6,833,937 B1 | 12/2004 | Cholewo | |
| 6,836,345 B1 | 12/2004 | Setchell | |
| 7,126,686 B2 * | 10/2006 | Tsujita | 356/328 |
| 7,265,830 B2 * | 9/2007 | Wang | 356/328 |
| 2001/0015806 A1 | 8/2001 | Baker | |
| 2001/0038468 A1 | 11/2001 | Hiramatsu | |
| 2002/0018121 A1 | 2/2002 | Fasciano | |
| 2002/0054384 A1 | 5/2002 | Motamed | |
| 2002/0105725 A1 * | 8/2002 | Sweatt et al. | 359/566 |
| 2002/0159065 A1 | 10/2002 | Berstis | |
| 2002/0169513 A1 | 11/2002 | Sherrill et al. | |
| 2003/0016289 A1 | 1/2003 | Motomura | |
| 2003/0053134 A1 | 3/2003 | Haro | |
| 2003/0156283 A1 | 8/2003 | Jung et al. | |
| 2003/0202183 A1 | 10/2003 | Beimers et al. | |
| 2003/0234943 A1 | 12/2003 | Van Bael | |
| 2004/0190022 A1 | 9/2004 | Kiyohara | |
| 2004/0207862 A1 | 10/2004 | Such et al. | |
| 2004/0218072 A1 | 11/2004 | Zhang | |
| 2004/0245350 A1 | 12/2004 | Zeng | |
| 2005/0024379 A1 | 2/2005 | Marks | |
| 2005/0065440 A1 | 3/2005 | Levenson | |
| 2005/0073545 A1 | 4/2005 | Vilanova et al. | |
| 2005/0073685 A1 | 4/2005 | Arai | |
| 2005/0078122 A1 | 4/2005 | Ohga | |
| 2005/0078326 A1 | 4/2005 | Stokes et al. | |
| 2007/0177141 A1 * | 8/2007 | Ohishi et al. | 356/308 |

FOREIGN PATENT DOCUMENTS

| | | |
|---|---|---|
| EP | 1489831 | 12/2004 |
| GB | 2381983 | 5/2003 |
| WO | WO9531794 | 11/1995 |
| WO | WO0042595 | 6/2000 |
| WO | WO0117233 | 3/2001 |
| WO | WO2004012442 | 2/2004 |
| WO | WO2004012461 | 2/2004 |

OTHER PUBLICATIONS

Daniels, "Eye-One Photo GretagMacbeth's Color Management For Professional Photographers," retrieved from the Internet on Nov. 22, 2005, http://www.shutterbug.com/test_reports/0304sb_eye/, Shutterbug, Mar. 2004, 5 pages.

Diffractive MEMS; 4 pages.

EETimes.com—Diffractive optical MEMs using grating light valve techinque; http://www.eetimes.com printed Jul. 18, 2005; 5 pages.

Drupa Product Review PT.1, Jun. 1, 2004; retrieved from the Internet Nov. 22, 2005: http://americanprinter.com/mag/printing_drupa_product_review/ pp. 1-8.

Godil, "Diffractive MEMS technology offer a new platform for optical networks"; Laser Focus World May 2002. 3 pages.

Hardeberg, "Color Management: Principles and solutions".

Starkweather; "Increasing Screen Size Valuing Productivity" Jun. 18, 2002; 31 pages.

King, Why Color Management? Adobe Systems Incorporated.

Knight, "Decreasing Downloaded Time through Effective Management", Microsoft Interactive Developer (1996).

Lieberman, Microsoft sets sights on future displays; www.eet.com; printed Jul. 18, 2005; 5 pages.

Media For; Laser Focus World; http://laserfocusworld.printthis.clickability.com; printed Jul. 18, 2005.

Ostromoukhov, et al., "Two Approaches In Scanner-Printer Calibration: Colorimetric Space-Based vs. "Closed-Loop"," IS&T/SPIE 1994 Int'l Symposium on Electronic Imaging: Science & Technology, Feb. 6-Feb. 10, 1994, 10 pages.

Printing system offers multiple formats, Apr. 8, 2003; retrieved from the Internet Nov. 22, 2005, http://news.thomasnet.com/fullstory/21137/447, pp. 1-6.

Riesenberg, et al., "Optical MEMS for High-End Micro-Spectrometers"; SPIE vol. 4928; 9 pages.

Rosen, et al., "Color Management within a Spectral Image Visualization Tool," retrieved from the Internet Nov. 22, 2005, http://www.cis.rit.edu/people/faculty/fairchild/PDFs/PRO10.pdf, 7 pages.

"Windows Color Management: Background and Resources." (2001). www.xrite.com/documents/literature/en/L11-044_DTP41_en.pdf; Unsurpassed Accuracy; DTP41 SeriesII AutoScan Spectrophotometer.

XYZ Observer Model 5B, retrieved from the Internet Nov. 22, 2005, http://www.spectralmasters.com/XYZ%20OBSERVER.html, 2 pages.

Yokoyama, et al., "A New Color Management System Based on Human Perception and its Application to Recording and Reproduction of Art Paintings", retrieved from the Internet Nov. 22, 2005, www.mi.tj.chiba-u.jp/~tsumura/Tsumura/papers/CIC5_yokoyama.pdf, The Fifth Color Imaging Conference: Color Science, Systems, and Applications, pp. 169-172.

* cited by examiner

COLOR MEASUREMENT USING COMPACT DEVICE

BACKGROUND

Color management refers to the process of processing color-related data so that colors are represented consistently across a variety of different devices and media. Color management systems can use color measurement devices to obtain representations of the color of a given surface.

The human visual system processes color within the visible portion of the electromagnetic spectrum in terms of the red, green, and blue components of this spectrum. This characteristic of the human visual system has led to the development of color management systems that measure, represent, and process colors using a three-channel approach for performance optimization reasons. In this approach, separate channels are devoted to measuring, representing, and processing the short, middle and long wavelength components of a given spectrum or achromatic, and orthogonal color difference channels.

Another approach to measuring, representing, and processing colors involves capturing a spectral representation of a given color. Such a spectral representation divides a portion of the electromagnetic spectrum (for example, the visible portion of the spectrum) into a number of channels corresponding to particular wavelengths or frequencies of interest. The spectral representation of the given color indicates how much energy or power that the components of the given color project into the wavelengths or frequencies of interest.

Diffraction gratings may be used to split an input beam of light into its spectral components. Typically, these components correspond to the wavelength or frequency components that combine to constitute the input light. In this sense, diffraction gratings produce results that are somewhat similar to those of a prism. If a diffraction grating is used in connection with a three-channel color management system, the red, green, and blue components of the input light may be collected and processed or alternative three channel representations can be collected and processed as appropriate such as CIEXYZ, CIELAB or YCC. If the diffraction grating is used in connection with a color management system that processes spectral representations of colors, then the diffraction grating may be adapted to generate three or more of the components of the input light. In any event, diffraction gratings typically present the chosen components of the input light simultaneously, rather than one-at-a-time or sequentially.

Because typical diffraction gratings produce their output components simultaneously, color measurement devices that operate with such typical diffraction gratings generally include a plurality of sensors or detectors. For convenience and conciseness, the term "sensor" as used herein is understood to refer to both a sensor and a detector. In a three-channel color management system, one sensor is typically dedicated to each one of the three channels. Thus, three sensors are provided, with one sensor for each of the red, green, and blue channels.

In a color management system processing spectral representations of colors, the output bandwidth of the diffraction grating may be divided into a one or more of wavelengths or frequencies (i.e., channels) of interest. The number of such channels depends on the resolution or granularity desired in the color management system, and this number may exceed three depending upon the capabilities of the post processing capabilities of the system. In any event, such spectral systems typically provide one sensor for each channel, a relationship similar to the three-channel systems discussed previously.

Whether in the context of a three-channel system or a system using spectral representations, typical color measurement devices typically employ one sensor for each channel or color component of interest. This one-to-one relationship between the sensors and the channels can increase the cost, bulk, and complexity of color management devices. Also, more particularly in the spectral context, if it is desired to analyze input light with more resolution and granularity, more channels are added. However, with these additional channels typically come additional sensors. Adding more sensors means that the same number of photons is shared among more sensors, thereby depleting the photon well available to each sensor and possibly causing an undesirable signal-to-noise (S/N) ratio for each sensor. Therefore, designers of color measurement devices and/or color management system that perform spectral processing may be faced with a trade-off between enhancing the resolution of the system, or having a system with a favorable S/N ratio.

Finally, some diffraction gratings may be manufactured from expensive optical materials, such as achromatic glass. Such diffraction gratings may be customized into specific cross-sections or configurations as appropriate to isolate specific frequencies or wavelengths of input light for analysis. All of the foregoing characteristics of typical diffraction gratings can increase the cost and bulk of a color management device that is manufactured using such typical diffraction gratings.

SUMMARY

Color measurement using compact devices is described herein. A color measurement device can include a diffraction grating that receives light reflected from a surface whose color is being measured. The diffraction grating is responsive to a control signal to split selected components from the reflected light and to admit the components in sequence to a sensor. A component can correspond to a selected wavelength or frequency of the reflected light. The sensor measures the energy or power level of each of the admitted components. The device can support determining a spectral representation of the color of the surface by generating output signals representing the various energy or power levels of each component of the light reflected from the surface. The device can also include a light source to illuminate the surface.

This Summary is provided to introduce a selection of concepts in a simplified form that are further described below in the Detailed Description. This Summary is not intended to identify key features to essential features of the claimed subject matter, nor is it intended to be used as an aid in determining the scope of the claimed subject matter.

BRIEF DESCRIPTION OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
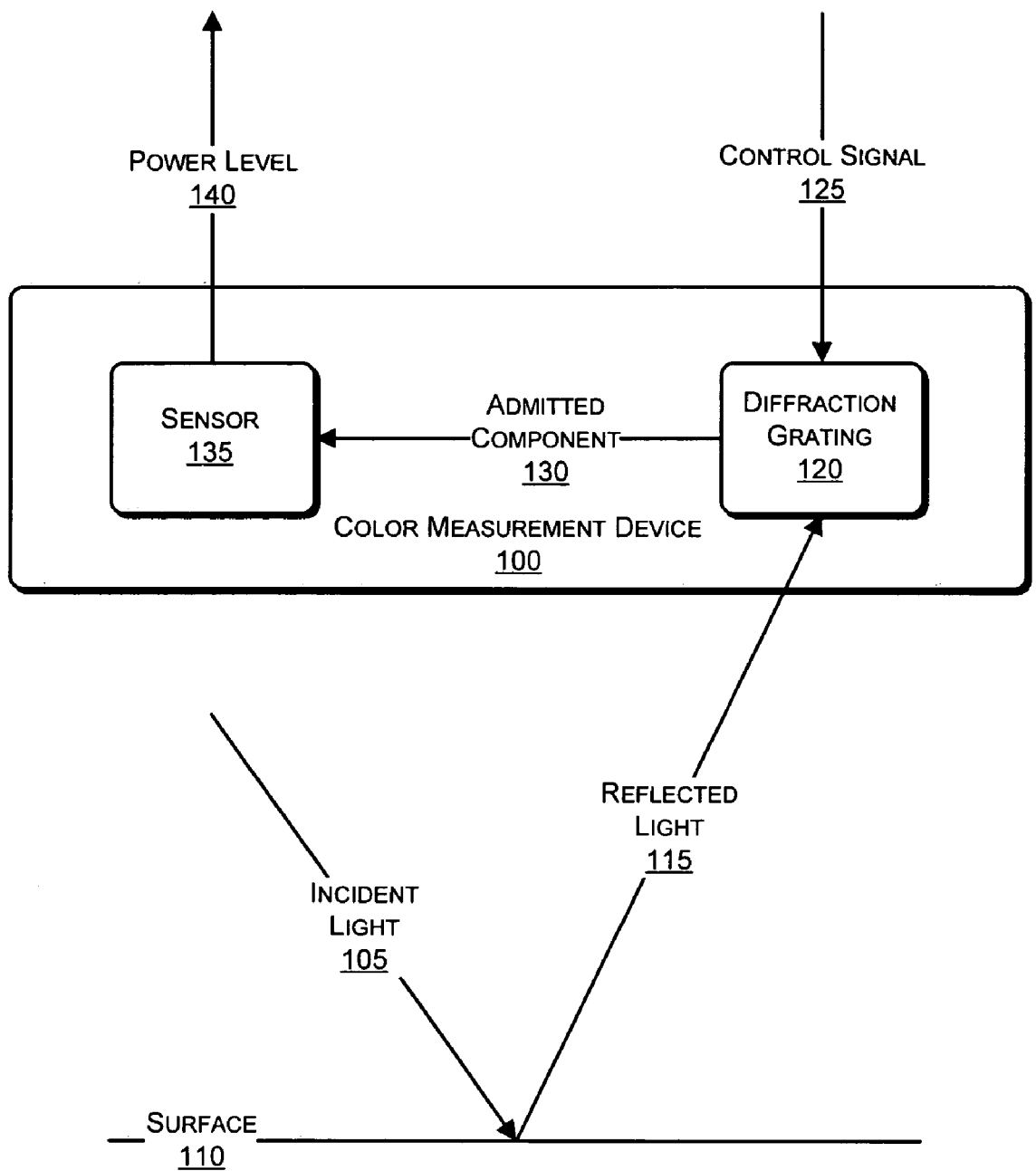
FIG. 1 is a combined block and flow diagram of an illustrative architecture for a compact color measurement device.

FIG. 1 illustrates an example architecture for a compact color measurement device 100. Incident light 105 strikes a surface 110 and is reflected therefrom as reflected light 115. Incident light 105 may originate from natural or artificial light sources external to the device 100, and may be viewed as ambient light, in the illustrative embodiment shown in FIG. 1.

The surface 110 is the surface whose color is to be measured using the color measurement device 100. The surface 110 may be composed of any organic or inorganic material, and may exhibit any surface configuration, texture, or characteristic (e.g., glossy, matte, or otherwise). The surface 110 is shown in FIG. 1 for clarity and conciseness of illustration and discussion only, and does not limit the applicability or construction of the color measurement device 100 or the subject matter described herein.

The light 115 reflected from the surface 110 may be analyzed to determine a color characteristic of the surface 110. The reflected light 115 is received by the device 110 through a diffraction grating 120. The diffraction grating 120 is responsive to an input control signal 125 to selectively admit a particular component 130 of the reflected light 115. To support this function, the diffraction grating 120 may be constructed at least in part of silicon, or may be constructed entirely of silicon, according to various embodiments of the teachings herein. The diffraction grating 120 may be constructed using, for example, microelectromechanical systems or micro-electronic movement (MEMS) techniques and technologies.

The diffraction grating 120 as described herein admits only a given selected component 130 of the reflected light 115 in response to a given value or level of the control signal 125. The value or level of the control signal 125 may be varied to admit different components 130 through the diffraction grating 120 in sequence. A given diffraction grating 120 may be associated with a bandwidth of frequencies or wavelengths that are admitted in sequence there-through as it scans through the spectrum. Illustrative examples of this bandwidth, expressed in terms of nanometers of wavelength, might include 5, 10, 20, or other wavelengths. The components 130 correspond to the bands of wavelengths or frequencies admitted in sequence by the diffraction grating 120.

Different implementations of the diffraction grating 120 having different levels of resolution among the wavelengths or frequencies of the reflected light 115 may thus be provided. For example, a lower-resolution diffraction grating 120 may admit relatively fewer individual bands of wavelengths, with each individual band including a higher number of different wavelengths. Thus, the lower-resolution diffraction grating 120 may provide favorable signal power while trading-off wavelength resolution.

As another example, a higher-resolution diffraction grating 120 may admit more individual bands of wavelengths, with each individual band including fewer different wavelengths. Thus, the lower-resolution diffraction grating 120 may provide favorable wavelength resolution while trading-off signal power.

In light of the foregoing discussion, a "coarse" spectrometer can be implemented using the teachings herein with a diffraction grating 120 that is operative in, for example, a 20 nm bandwidth increment. A "very fine" spectrometer can be implemented with a diffraction grating 120 that is operative in, for example, 1-2 nm bandwidth increment. In other implementations, a bandwidth increment of, for example, 5-10 nm may be suitable.

The human visual system can perceive visible light that has wavelengths between about 450 nm and 650 nm in the electromagnetic spectrum. Diffraction gratings constructed of conventional optical materials typically present all components of a given input beam of light at once, rather than presenting the components selectively and one-at-a-time in sequence. Thus, if visible light is passed through a diffraction grating constructed of optical materials (e.g., glass or other inflexible material), the diffraction grating splits the light into its constituent components (whether expressed in terms of, e.g., wavelengths or frequencies), and makes all output components available at once. If different components are desired, a different optical diffraction grating is substituted.

In contrast to diffraction gratings constructed of optical materials such as glass, the diffraction grating 120 admits only a given component 130 in response to a given value of the control signal 125. The diffraction grating 120 may be composed of a flexible material, such as silicon, that can change some physical characteristic or configuration in response to variations of the control signal 125. For example, the diffraction grating 120 may elongate or shorten in response to different values or levels of the control signal 125, thereby admitting different frequency or wavelength components 130. If a different component 130 is desired at a given time, the value of the control signal 125 is varied to select a different component 130 to admit, without having to use a different diffraction grating 120. This function is discussed further below in connection with FIG. 2.

The color measurement device 100 includes a sensor 135 that receives the component 130 admitted through the diffraction grating 120. The component 130 of the reflected light 115 may be, for example, a given frequency or wavelength, or group of frequencies or wavelengths, of the reflected light 115. The sensor 135 processes or analyzes the component 130 to determine a power or energy level 140 of the component 130 that is admitted through the diffraction grating 120. The color of the surface 110 can be determined by measuring the power levels 140 of a plurality of such components 130.

Because the diffraction grating 120 is operative in response to the control signal 125 to admit only a given component 130 at a given time, the color measurement device 100 can use only one sensor 135. In this sense, the sensor 135 can be viewed as being multiplexed or shared between a plurality of different components 130. Each component 130 is admitted by the diffraction grating 120 and presented to the sensor 135 in sequence or one-at-a-time in response to variations of the control signal 125. In contrast, other diffraction gratings constructed of optical materials may present a plurality of different components as output simultaneously. For this reason, as discussed above, color measurement devices that use such diffraction gratings typically employ one sensor for each one of the simultaneously-output components. However, the device 100 avoids the bulk and cost of such multiple sensors by presenting components to the sensor 135 in sequence or one-at-a-time rather than simultaneously.

Figure 2:
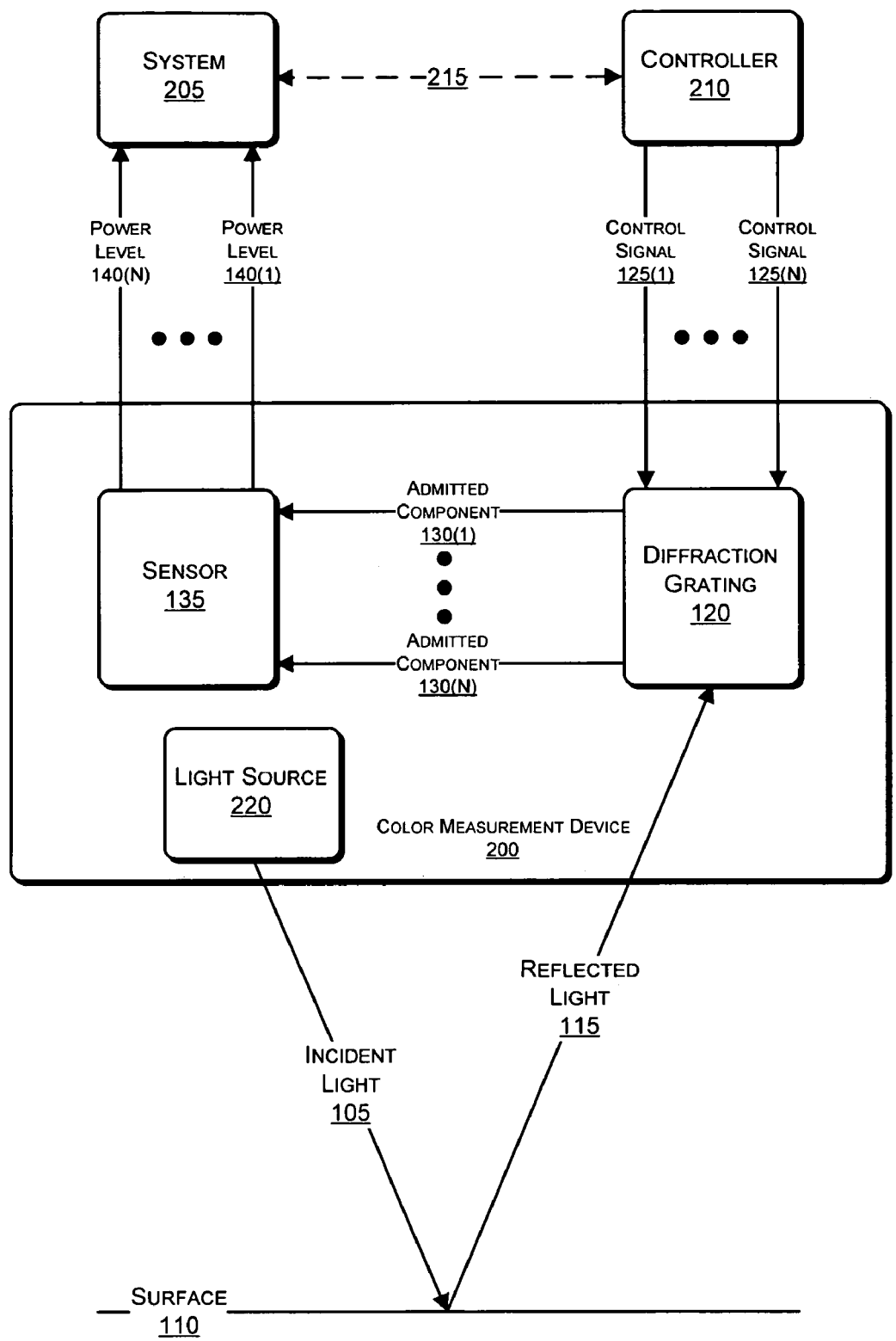
FIG. 2 is a combined block and flow diagram of another embodiment of the compact color measurement device, particularly illustrating generation of successive power level measurements for a sequence of admitted components of reflected light.

FIG. 2 illustrates another embodiment 200 of the color measurement device, particularly illustrating measurements of successive power levels 140 for a sequence of admitted components 130 of the reflected light 115 in response to a plurality of different control signals 125. As shown in FIG. 1, the reflected light 115 is received by the diffraction grating 120. For convenience of illustration and discussion, FIG. 2 shows control signals 125(1) and 125(N) as input to the diffraction grating 120, where N can be any positive integer and is chosen to correspond to the number of components 130 that are to be presented in sequence to the sensor 135. For example, if is desired to sample or measure the power level 140 of each whole wavelength of the reflected light 115 that lies within the spectrum of light visible to the human visual system (i.e., all whole wavelengths between 450 nm and 650 nm), then N can be set to 201.

For convenience, control signals 125(1) through 125(N) are referred to collectively as control signals 125. It is noted that the layout and configuration of the control signals 125 is shown in FIG. 2 only for illustration and not for limitation. More particularly, the different control signals 125 may be implemented as a plurality of voltages or currents, each one of which is defined and modulated or varied to correspond to a particular component 130 to be admitted through the diffraction grating 120. In some embodiments, the control signals 125 may take analog or digital form, may conform to any convenient or suitable protocol or format, and may be transmitted or processed in connection with appropriate analog-to-digital or digital-to-analog converters. The latter are omitted from the drawings for conciseness.

Further, various different values or levels of the control signals 125 may be transmitted along a given line or channel at different times. Alternatively, a plurality of respective lines or channels may be provided, with ones of the lines or channels being dedicated to particular values of the control signals 125 and corresponding admitted components 130. As an example of the latter implementation, when a given line or channel goes "high", that condition can indicate that a particular component 130 should be admitted through the diffraction grating 120. In any event, the diffraction grating 120 need not be replaced to admit different wavelength or frequency components 130. Instead, the control signal 125 as provided to the same diffraction grating 120 is varied.

The sensor 135 as shown in FIG. 2 is operative to receive and analyze the various components 130(1) through 130(N) that are admitted in sequence by the diffraction grating 120. As discussed elsewhere herein, the components 130 may correspond to various wavelengths or frequencies of light in the visible spectrum, ranging from approximately 450 nm to 650 nm. The sensor 135 generates a plurality of signals 140(1) through 140(N) that indicate the power or energy levels of the various components 130(1) through 130(N). Taken cumulatively, these signals 140(1) through 140(N) provide a spectral representation of the color of the surface 110, and may be considered the output of the color measurement device 100.

A system 205 receives the output signals 140 from the color measurement device 100, and performs further processing based on the spectral representation of the color of the surface 110. The system 205 may be implemented in whole or in part using the computing environment shown in FIG. 7 below, and discussed in connection therewith. The system 205 may be, for example, a color management system that includes the color measurement devices 100 or 200.

In the embodiment shown in FIG. 2, a controller 210 generates the controls signals 125 that determine which component 130 is admitted through the diffraction grating 120. The controller 210 can be implemented as hardware, software, or a combination of the foregoing. Also, the controller 210 can be implemented as part of the device 200, or as part of the system 205. The Controller 210 is shown in FIG. 2 as a separate block for convenience of illustration and discussion only, and not to limit possible implementations of the subject matter described herein. For convenience only, the line 215 shown between the system and the controller 210 represents communication and/or integration therebetween, such that signals 140 and 125 may be considered as coming to/from either one of these entities.

Assuming a software implementation of the controller 210, it can be implemented as, for example, firmware within the device 200, as utility software within the system 205, or other suitable implementations. In any event, the controller 210 can send control signals 125 to the diffraction grating 120 to produce different power signals 140. Afterwards, the controller 210 can wait until the sensor 135 collects a reasonable power signal 140. The power signal 140 can be sent back to the system 250, or to the controller 210 via line 215. Also, a parameter indicating the time it took to collect the power signal 140 can also be provided. These parameters provide the system 205 and/or the controller 210 with data including, but not limited to, one or more of the following:

1) the wavelengths measured, which can be computed from the physics of the particular diffraction grating 120 and from the power applied to it from the control signal 125,
2) the time span over which the power signal 140 was collected upon the sensor 135,
3) the power level signal 140 collected by the sensor 135, and
4) one or more additional static parameters relating to the sensor 135 (for example, the spectral efficiency of the sensor 135) that may be useful in converting the parameters references in 1, 2, and 3 above into a power spectral distribution plot (e.g., power levels 140 vs. input wavelength components 130).

FIG. 2 also depicts a light source 220 that may be included as part of the color measurement devices 100 or 200. The light source 220 serves to illuminate the surface 110 as may be appropriate when ambient light (whether artificial or natural) is not sufficient for measuring the color of the surface 110. In a non-limiting embodiment, the light source 220 may be implemented as, for example, a white light-emitting diode (LED), red, green, or blue LEDs, or combinations of such LEDs. Also, other light sources 210 such as tungsten may also be appropriate.

The color measurement devices 100 or 200 may be deployed as a component in a variety of different devices or systems. As non-limiting deployment examples, the color measurement devices 100 or 200 can be included as part of displays, printers, cameras, computer mice or other hand-held devices, or the like.

Regarding displays on tablet computers, laptop devices, or other similar relatively compact, portable computing devices, the spectral representations of colors provided by the color measurement devices 100 or 200 may enable a given color to be presented on a display consistently in different lighting environments. For example, the color(s) in which a given surface 110 is presented on a display may be varied depending on the ambient lighting conditions and what type of light source is present.

Additionally, the brightness level of the display may be adjusted automatically depending on lighting conditions. For example, absent a spectral representation of the given surface 110 as provided by the color measurement devices 100 or 200, such a surface may appear differently on a display depending on whether that display is viewed outdoors in sunlight, as compared to being viewed indoors under artificial lighting conditions. However, the color measurement devices 100 or 200 can provide spectral representations of the given surface 110. Using this spectral representation of the surface 110 as a baseline or foundation, the display of that surface 110 can be optimized for different lighting conditions, and to minimize power consumption associated with the display.

Regarding applications in cameras, the color measurement devices 100 or 200 can enable, for example, the automatic identification of the spectral white point of a given light source illuminating the surface 110. This feature can relieve the user of a device incorporating the color measurement devices 100 or 200 from having to manually find an optimum exposure level for a given set of lighting conditions. Also, with the spectral representation of the surface 110 as a baseline, the camera can perform more sophisticated color processing than would otherwise be possible.

Regarding applications in compact, portable devices such as mice coupled to a system 205, such as a computer-based system, the color measurement devices 100 or 200 can enable an operating system related to such computer systems to provide spectral support for color in a color management system, as opposed to three-channel color support. Similarly, the color measurement devices 100 or 200 may be incorporated into a handheld scanner that may be used to capture spectral representations of surfaces 110 in the field and quickly communicate these representations to, for example, manufacturers or suppliers. These parties, in turn, can analyze the spectral representation captured using the color measurement devices 100 or 200 to assess, for example, whether materials may be manufactured in the color corresponding to the input spectral representation, or how closely existing goods come to approximating the input spectral representation.

Other illustrative but non-limiting examples of applications for the color measurement devices 100 or 200 can include enabling catalog merchants to include more accurate representations of products in their catalogs. For example, more accurate representations of fabric colors in printed catalogs can reduce the cost of goods that are returned by customers because the color of the actual fabric deviated from how the fabric appeared in the printed catalog. The color measurement devices 100 or 200 can be used to obtain the spectral representation of the color of a surface 110 in the form of a given fabric. Afterwards, the catalog printing process can be optimized using the spectral representation of the fabric color to account for the type of paper on which the catalog is printed, the type of equipment and/or ink used to print the catalogs, the lighting conditions under which the catalog is likely to be viewed, and the like.

Also, online merchants may present images or videos of their goods for viewing by customers over a wide variety of equipment and software, such as, for example, displays, video adaptor cards, operating systems, browser software, and the like. Different equipment and software may display a given color differently. However, given a spectral representation of the color of particular goods, a color management system using the color measurement devices 100 or 200 can optimize the display of the goods to accommodate particular equipment or software used by a particular on-line shopper.

In the context of workflows that involve the specification, processing, and/or matching of particular colors of paint, the spectral representations of color provided by the color measurement devices 100 or 200 can minimize any color variations in the workflow that may arise from, for example, different lighting conditions that may occur in different stages of the workflow. For example, using the color measurement devices 100 or 200, an automotive design firm or manufacturer can quickly capture a spectral representation of a proposed color that is being considered as a paint color option, and route this spectral representation of the proposed color to its paint suppliers or manufacturers to assess manufacturability of that proposed color. Because a spectral representation of the proposed color is used, whether the target color was captured in natural light (e.g., outdoors) or in artificial light (e.g., indoors) does not affect subsequent stages of the workflow involving that captured target color. As another example, a collision repair shop seeking to match an existing color of paint need not compensate for lighting conditions present when the existing paint color is captured.

The color measurement devices 100 or 200 may also be applied in an agricultural context to obtain spectral representations of, for example, the colors of leaves or crops to assess the condition of plants and to identify any nutritional deficiencies the plants or crops may be experiencing. The color measurement devices 100 or 200 may also be applied in the context of oil or mineral exploration to capture spectral representations of soil samples, mineral samples, or the like, to assess the likelihood that oil or mineral deposits may lie in the area from which the sample was extracted.

Figure 3:
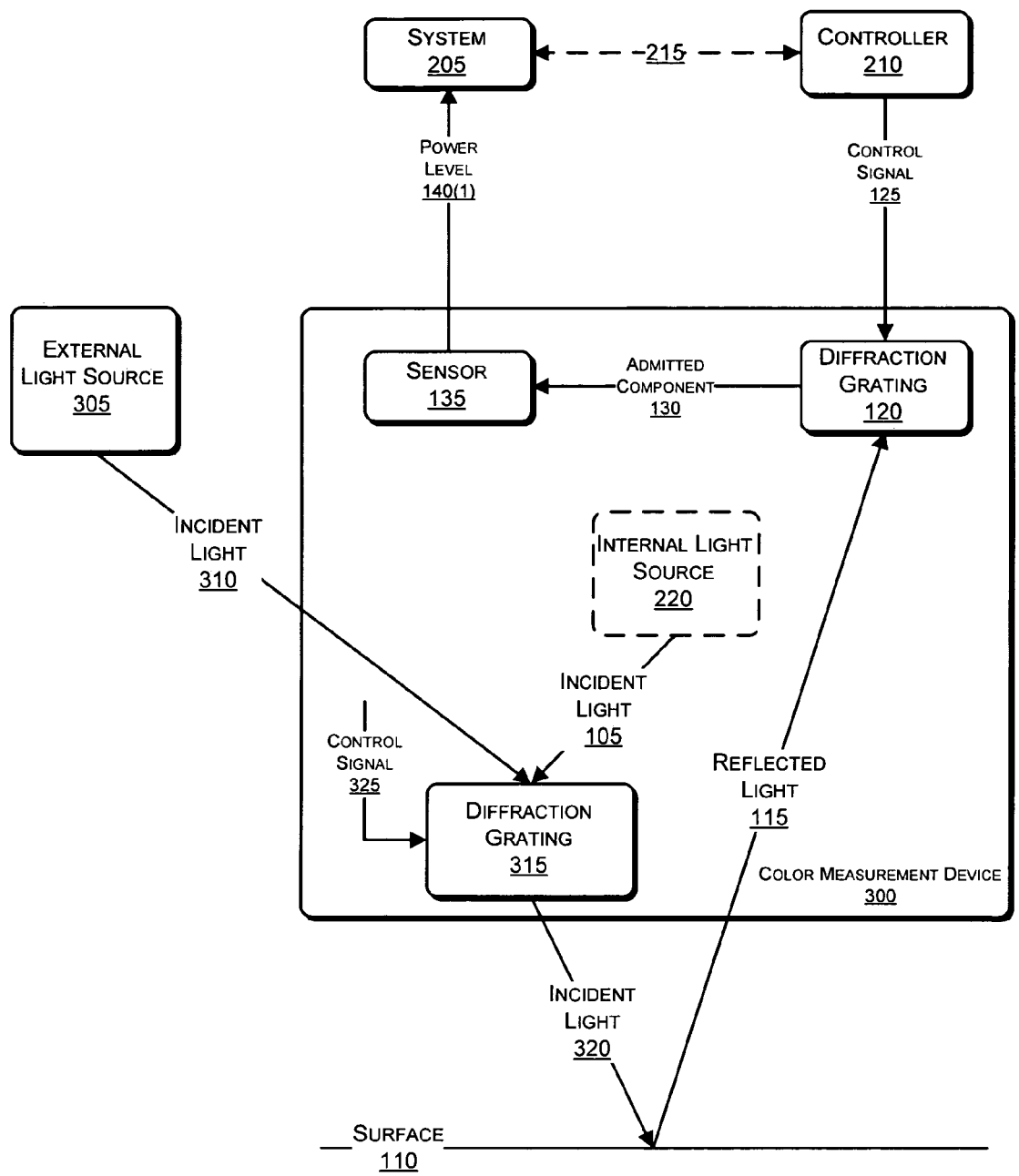
FIG. 3 illustrates another embodiment of the color measurement device.

FIG. 3 illustrates another embodiment 300 of the color measurement device. An external light source 305 is shown in FIG. 3, and this light source 305 is external to the color measurement device 300. In contrast, the light source 220, which was introduced in FIG. 2 and is carried forward in FIG. 3, can be disposed internally within the color measurement device 300. The light source 305 may take natural or artificial form. For example, the light source 305 may be natural ambient sunlight, or may be artificial light created using any suitable technology.

The light source 220 is carried forward from FIG. 2, but is shown in dashed outline to indicate its optional status in FIG. 3. More particular, some implementations of the color measurement device 300 may rely entirely on the external light source 305, and therefore not include an internal light source 220. Other embodiments of the color measurement device 300 may include only the internal light source 220 and not the external light source 305. Still other embodiments of the color measurement device 300 may include both the internal light source 220 and the external light source 305.

In any event, the light source 305 emits a beam of incident light 310, which is received by a diffraction grating 315 that is disposed within the color measurement device 300. Alternatively or additionally, the light source 220 emits a beam of incident light 105 that is received by the diffraction grating 315. The diffraction grating 315 can be implemented similarly to the diffraction grating 120 introduced in FIG. 1. The diffraction grating 315 can be operative to admit a given wavelength or frequency of the incident light 310 through the diffraction grating 315 as incident light 320. The incident light 320 is directed onto the surface 110 under measurement, and the reflected light 115 is received by the diffraction grating 120 and processed as discussed above. The diffraction grating 315 may be responsive to a control signal 325 to select which wavelength or wavelengths (or which frequency or frequencies) of the incident light 310 are admitted through the diffraction grating 315. The control signal 325 may be implemented similarly to the control signals 125 discussed previously.

In an illustrative but non-limiting application, the color measurement device 300 may be used to measure fluorescence. Measuring fluorescence may be useful to determine the level of whiteness or brightness of papers. Fluorescence is the physical effect of absorbing light at one wavelength and then emitting it at a different wavelength. In the absence of fluorescence, only wavelengths admitted by both the diffraction gratings 120 and 315 will reach the sensor 135 to be detected, assuming that the surface 110 reflects at that wavelength. However, the color measurement device 300 can measure the effect of fluorescence by setting the diffraction grating 315 to admit the wavelength absorbed by the surface 110 and by setting the diffraction grating 120 to admit the wavelength emitted by the surface 110 as a result of fluorescence.

Additionally, it is noted that the incident light 310 or 105 may take the form of infrared (IR) or ultraviolet (UV) radiation. A surface exhibiting fluorescence may absorb UV light and emit it as blue light, after energy losses in the process. The phenomenon explains why brightened papers sometimes have a bluish appearance.

Figure 4:
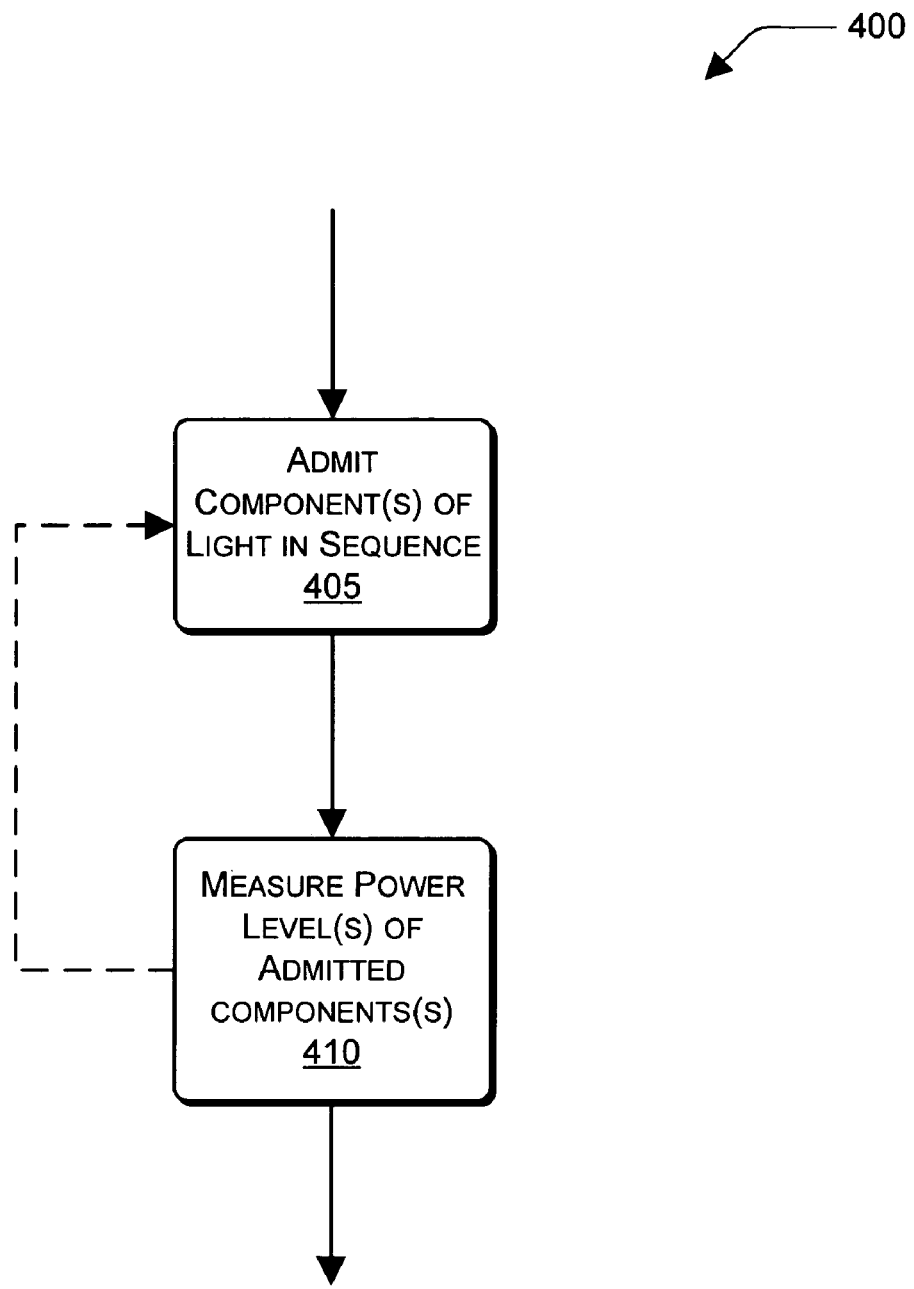
FIG. 4 is a flow diagram of an illustrative method of operation that may be employed by a compact portable color measurement device.

FIG. 4 illustrates a method of operation 400 for performing color measurement. While the description herein references the color measurement devices 100 or 200, or components thereof, as being suitable for performing color measurement, it is understood that the methods disclosed herein may be practiced with devices, systems, or apparatus other than those described herein.

In block 405, one or more components 130 of the reflected light 115 are admitted in sequence for processing. As discussed elsewhere, the sequential or one-at-a-time processing of the components 130 is distinguished from the operation of glass-based optical diffraction gratings, which typically present all output components of an input light beam simultaneously. With such glass-based optical diffraction gratings, multiple sensors are typically deployed to capture these various components simultaneously. In contrast, the method 400 includes admitting these components 130, in sequence or one-at-a-time. As discussed elsewhere, the components 130 may be, for example, selected wavelengths or frequencies in which the color of the surface 110 may be measured or expressed.

In block 410, the power or energy levels 140 of the various components 130 are measured. By accumulating the power or energy levels 140 measured for each desired component 130, the method 400 can define a spectral representation of the color of the surface 110. As indicated by the dashed line shown in FIG. 4 running from block 410 to block 405, the processing represented by blocks 405 and 410 may be repeated for each desired component 130 of the light 115 reflected from the surface 110. As a non-limiting example, recall that the human visual system can perceive the portion of the electromagnetic spectrum that runs from approximately 450 nm to 650 nm. The wavelengths or bandwidth falling between these two thresholds may be partitioned as appropriate into any number of selectable components 130. Each component 130 may correspond to a single whole wavelength, or may correspond to a group of selected wavelengths. In any event, blocks 405 and 410 may be repeated as appropriate for each component 130.

Figure 5:
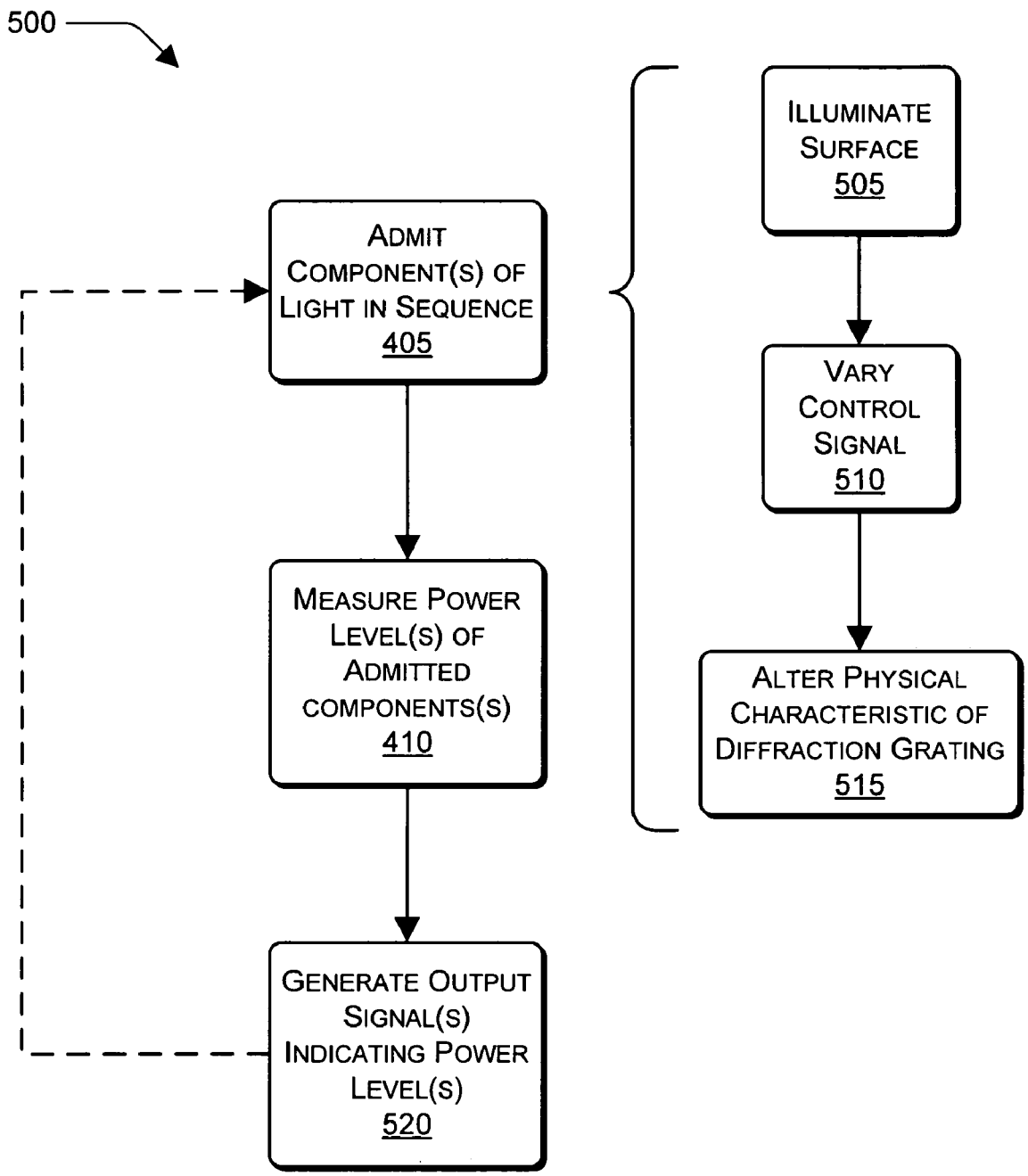
FIG. 5 is a flow diagram of further illustrative aspects of the method of operation shown in FIG. 3.

FIG. 5 illustrates further aspects of a method of operation 500 for performing color measurement. As shown in FIG. 5, the method 500 carries forward blocks 405 and 410 as shown in FIG. 3. Block 405 is expanded into blocks 505, 510, and 515. In block 505, the surface whose color is being measured (e.g., the surface 110 shown in FIG. 1) can be illuminated, whether by ambient light or by an additional light source (e.g., the light source 220 shown in FIG. 2). In block 510, a control signal is varied to determine which component of the light reflected from the surface is admitted for measurement. As discussed above, the control signal 125 shown in FIGS. 1 and 2 may provide an example of the control signal that is varied in block 510. In block 515, a diffraction grating 120 may be physically altered in response to the control signal 125 to admit the selected component 130 of the reflected light 115.

In block 520, output signals are generated that indicate the energy or power levels 140 present for each component 130 in the reflected light 115 admitted for processing. Similarly to FIG. 4 above, FIG. 5 includes a dashed line running from block 520 to block 405 to indicate that blocks 405, 410, and 520 may be repeated for each component 130 that is to be included in defining the spectral representation of the reflected light 115.

Figure 6:
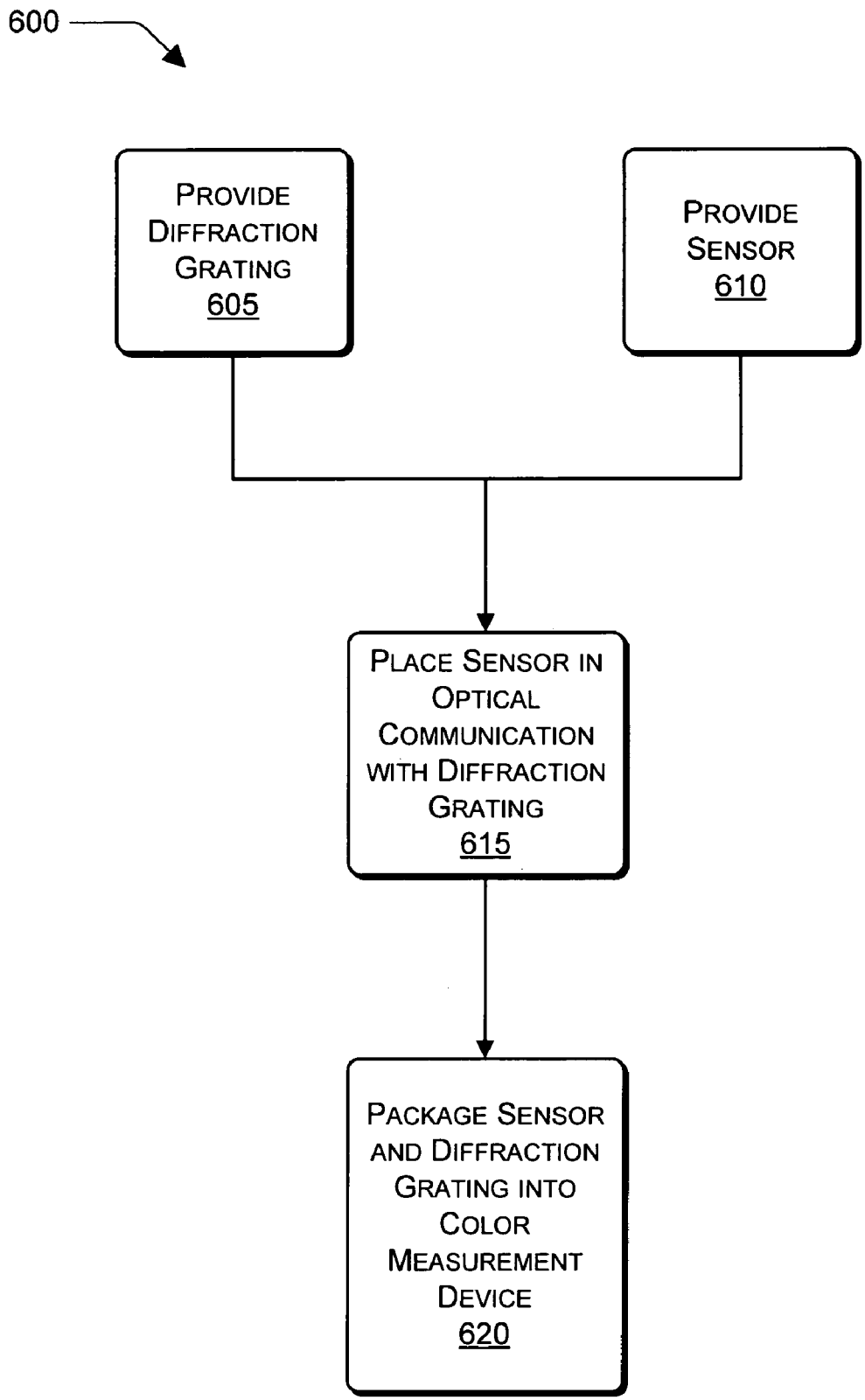
FIG. 6 is a flow diagram of an illustrative method of making a compact portable color measurement device.

FIG. 6 illustrates a method 600 for making the compact portable color measurement device 100 shown in FIG. 1. In block 605, a diffraction grating 120 is provided for inclusion in the device 100, and in block 610, a sensor 135 is provided for inclusion in the device 100. The processing represented in blocks 605 and 610 can proceed in parallel or sequentially, and the process flow shown in FIG. 6 should be considered an illustrative and non-limiting configuration. For example, the processing represented by block 605 can occur before the processing represented by 610, or afterwards.

In block 615, the sensor 135 provided in block 610 is placed in optical communication with the diffraction grating 120 provided in block 605. More particularly, the sensor 135 is configured to receive the components 130 of the light 115 that are reflected from the surface 110 and are admitted through the diffraction grating 120. A suitable, but non-limiting, configuration of the sensor 135 and the diffraction grating 120 is shown in FIG. 1. As noted elsewhere, the color measurement devices 100 or 200 can achieve compactness and cost savings by utilizing only one sensor 135 to measure multiple components 130 of the reflected light 115 admitted in sequence by the diffraction grating 120.

In block 620, the sensor 135 and the diffraction grating 120 are packaged into the color measurement device 100. As discussed elsewhere, the color measurement devices 100 or 200 can be incorporated into a variety of devices, such as displays for computer systems, printers and printing systems, handheld devices such as scanners, cameras, input devices such as a mouse, and the like.

Figure 7:
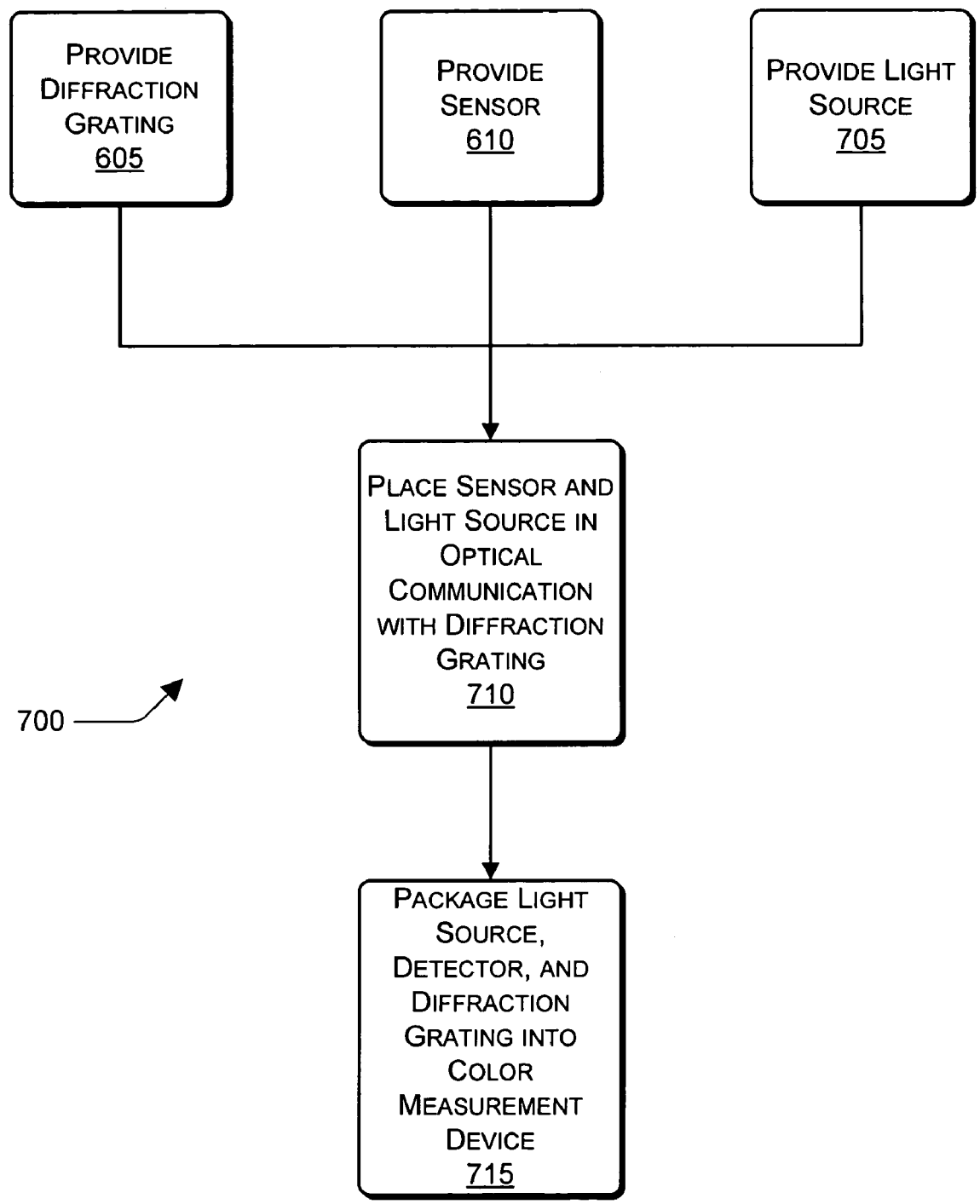
FIG. 7 is a block diagram of further illustrative aspects of the method of making shown in FIG. 6.

FIG. 7 illustrates further aspects of a method 700 of making the color measurement device 200 shown in FIG. 2. Blocks 605 and 610 are carried forward from FIG. 6. In block 705, the light source 220 is provided, in addition to the diffraction grating 120 provided in block 605 and the sensor 135 provided in block 610. It is noted that blocks 605, 610, and 705 can occur in any relationship to one another.

In block 710, the sensor 135, the light source 220, and the diffraction grating 120 are configured in optical communication with one another, so that light 105 emitted from the light source 210 reflects off the surface 110 whose color is being measured. The reflected light 115 is received by the diffraction grating 120, and components 130 of the reflected light are admitted sequentially by the diffraction grating 120 to the sensor 135. The layout shown in FIG. 2 provides an illustrative but non-limiting configuration corresponding to block 710.

In block 715, the light source 220, the sensor 135, and the diffraction grating 120 are packaged into the color measurement devices 100 or 200. Examples of devices and systems into which the color measurement devices 100 or 200 can be integrated as a component are discussed above.

Figure 8:
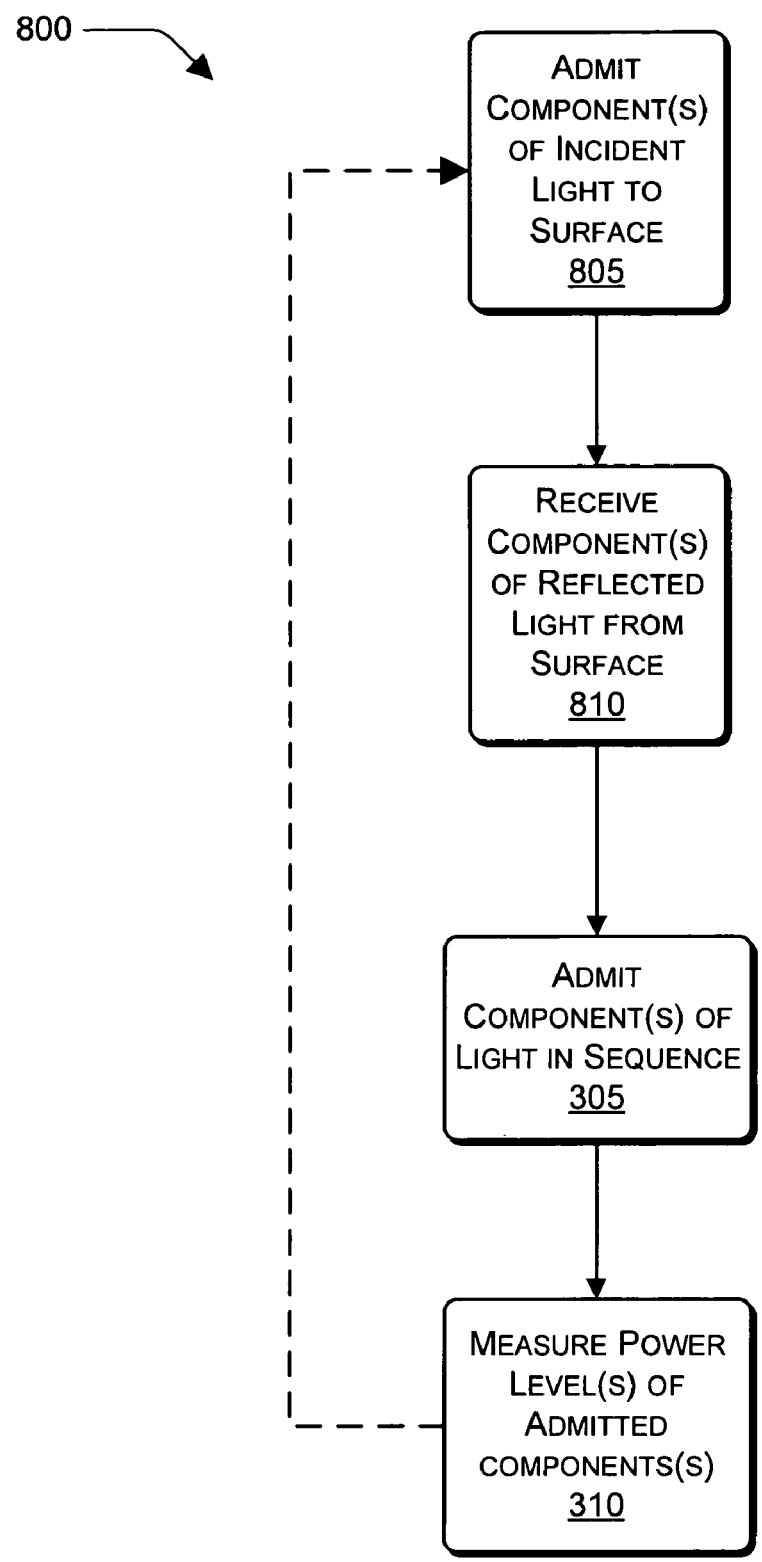
FIG. 8 is a flow diagram of an illustrative method that may be employed for measuring fluorescence.

FIG. 8 illustrates aspects of a process 800 for measuring fluorescence. It is understood that while the process 800 is described herein as suitable for execution in connection with the color measurement device 300, the process 800 could be executed in connection with other color measurement devices without departing from the spirit and scope of the subject matter taught herein.

In block 805, components of an incident light beam are admitted to a surface whose color is being measured. More particularly, the fluorescent characteristics of the surface are being measured. Referring briefly to FIG. 3, the processing represented by block 805 can correspond to the functions performed by the diffraction grating 315 in connection with selecting selected one or more wavelength or frequency components of the incident light 310, and admitting the same as incident light 320. The incident light 320 is then reflected from the surface 110.

Returning now to FIG. 8, in block 810, components of light reflected from the surface under measurement are received. Referring briefly once again to FIG. 3, the processing represented by block 810 can correspond to the functions performed by the diffraction grating 315 in connection with selecting one or more wavelength or frequency components of the reflected light 115 to processing by the sensor 135.

Blocks 305 and 310 are carried forward from FIG. 3, and represent similar processing performed in the context of the process 800. In block 305, the process 800 selects and determines which wavelength or frequency component(s) of the incident light are admitted to the surface under measurement. More specifically, particular wavelength or frequency components of the incident light may be admitted, for example, by the diffraction grating 315 shown in FIG. 3, to the surface under measurement.

In block 310, the process 800 measures the power levels of the various wavelength or frequency component(s) of the light reflected from the surface. With the particular wavelength or frequency component admitted to the surface held fixed, the process 800 can sweep or scan sequentially through the wavelength or frequency component(s) of the light reflected from the surface, and determine the respective power or energy levels associated with each component. By comparing the wavelength or frequency of the admitted incident light with the wavelength or frequency of the admitted reflected light that has relatively high power or energy, the process 800 can determine how much, if any, fluorescence is exhibited by the surface.

As with FIG. 3, FIG. 8 includes a dashed line connecting blocks 310 and 805. This dashed line indicates that the process 800 may be repeated as appropriate to admit different wavelength or frequency components sequentially to the surface under measurement (using e.g., the diffraction grating 315). The admitted wavelength or frequency component of the incident light is then used to illuminate the surface. For each different wavelength or frequency component admitted in sequence to the surface, the process 800 can sequentially scan through the wavelength or frequency components of the light that is reflected from the surface when illuminated with the incident light. The process 800 can be repeated any number of times to test, for example, the fluorescence exhibited by the surface when illuminated with different wavelength or frequency components of the incident light.

Figure 9:
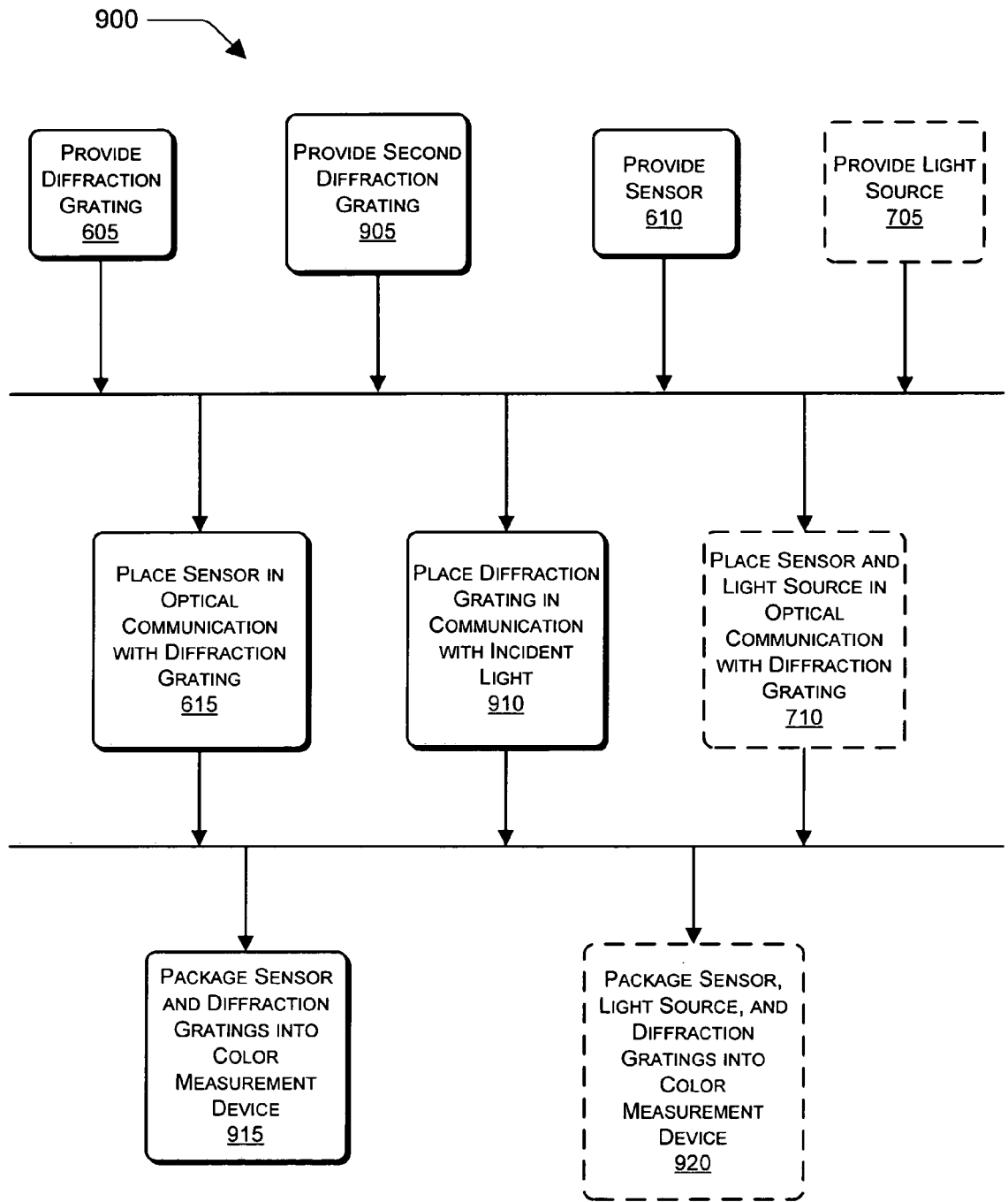
FIG. 9 is a flow diagram of an illustrative method of making the color measurement device shown in FIG. 3.

FIG. 9 illustrates a process 900 for constructing the color measurement device 300 shown in FIG. 3. Block 605 is carried forward from FIG. 6, wherein the diffraction grating 315 is provided for inclusion in the color measurement device 300. In block 905, at least a second diffraction grating 315 is provided for inclusion in the color measurement device 300. Block 610 is carried forward from FIG. 6, wherein the sensor 135 is provided for inclusion in the color measurement device 300. Block 705 is carried forward from FIG. 7, and is shown in dashed outline to indicate that it is optional in nature. The light source 220 may be included in some embodiments of the color measurement device 300, but need not be included in all implementations of the color measurement device 300. Where the light source 220 is omitted, so too is block 705. It is noted that blocks 605, 905, 610, and 705 may occur in any order relative to one another.

Block 615 is carried forward from FIG. 6 to represent placing the sensor 135 in optical communication with the diffraction grating 120, as discussed above in connection with FIG. 6. In block 910, the diffraction grating 315 is placed so that it will be in optical communication with the incident light beam 310 when the color measurement device 300 is in operation. Block 710 is carried forward from FIG. 6, and its dashed outline in FIG. 9 indicates its optional status. In implementations of the color measurement device 300 that include the light source 220, block 710 represents placing the light source 220 in communication with the diffraction grating 315. Where the light source 220 is omitted, so too is block 710. It is noted that blocks 615, 710, and 910 may occur in any order relative to one another.

In block 915, the sensor 135 and the diffraction gratings 315 and 120 are packaged into the color measurement device 300 in the relationships established above in blocks 615 and 710. Block 920 represents implementations in which the color measurement device 300 includes a light source 220. In block 920, the sensor 135, the light source 220, and the diffraction gratings 315 and 120 are packaged into the color measurement device 300 in the relationships established above in blocks 615, 710, and block 910.

Figure 10:
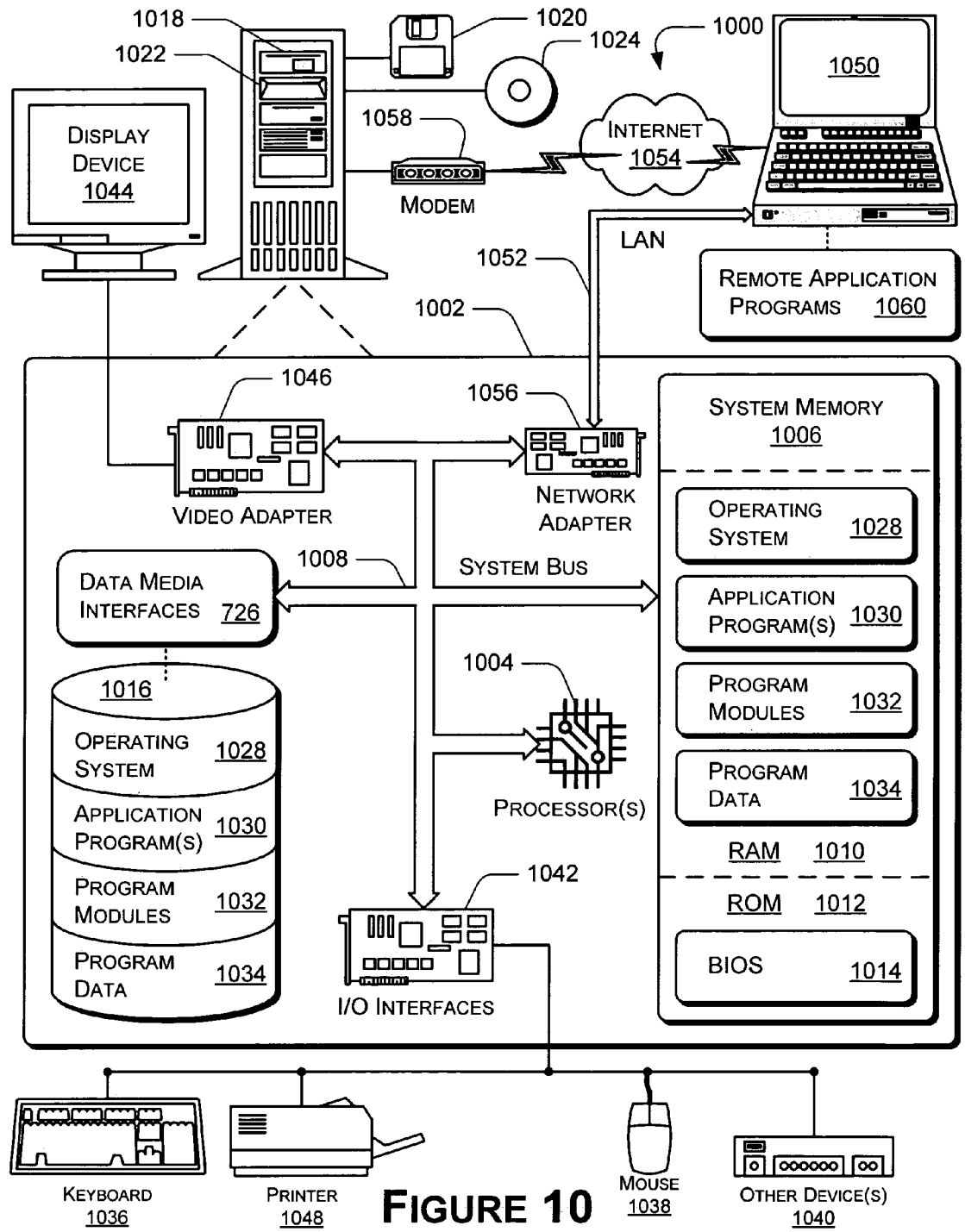
FIG. 10 is a block diagram of an illustrative computing system with which a compact portable color measurement device as taught herein can be either fully or partially integrated.

FIG. 10 illustrates an exemplary computing environment 1000 within which color measurement using compact devices, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000. The environment 1000 may be used, in whole or in part, to implement the system 205 shown in FIG. 2.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on RAM 1010, ROM 1012, hard disk 1016, magnetic disk 1020, and/or optical disk 1024, including by way of example, an operating system 1028, one or more application programs 1030, other program modules 1032, and program data 1034. Each of such operating system 1028, application program(s) 1030, other program modules 1032, program data 1034, or any combination thereof, may include one or more embodiments of the systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1002 via any number of different input devices such as a keyboard 1036 and pointing device 1038 (e.g., a "mouse"). Other input devices 1040 (not shown specifically) may include a microphone, joystick, game pad, controller, satellite dish, serial port, scanner, and/or the like. These and other input devices are connected to the processors 1004 via input/output interfaces 1042 that are coupled to the system bus 1008, but may be connected by other interface and bus structures, such as a parallel port, game port, and/or a universal serial bus (USB).

A display device 1044 (or other type of monitor) can be connected to the system bus 1008 via an interface, such as a video adapter 1046. In addition to the display device 1044, other output peripheral devices can include components such as speakers (not shown) and a printer 1048, which can be connected to computing device 1002 via the input/output interfaces 1042.

Computing device 1002 can operate in a networked environment using logical connections to one or more remote computers, such as remote computing device 1050. By way of example, remote computing device 1050 can be a personal computer, portable computer, a server, a router, a network computer, a peer device or other common network node, and the like. The remote computing device 1050 is illustrated as a portable computer that can include any number and combination of the different components, elements, and features described herein relative to computing device 1002.

Logical connections between computing device 1002 and the remote computing device 1050 are depicted as a local area network (LAN) 1052 and a general wide area network (WAN) 1054. Such networking environments are commonplace in offices, enterprise-wide computer networks, intranets, and the Internet. When implemented in a LAN networking environment, the computing device 1002 is connected to a local network 1052 via a network interface or adapter 1056. When implemented in a WAN networking environment, the computing device 1002 typically includes a modem 1058 or other means for establishing communications over the wide area network 1054. The modem 1058 can be internal or external to computing device 1002, and can be connected to the system bus 1008 via the input/output interfaces 1042 or other appropriate mechanisms. The illustrated network connections are merely exemplary and other means of establishing communication link(s) between the computing devices 1002 and 1050 can be utilized.

In a networked environment, such as that illustrated with computing environment 1000, program modules depicted relative to the computing device 1002, or portions thereof, may be stored in a remote memory storage device. By way of example, remote application programs 1060 are maintained with a memory device of remote computing device 1050. For purposes of illustration, application programs and other executable program components, such as operating system 1028, are illustrated herein as discrete blocks, although it is recognized that such programs and components reside at various times in different storage components of the computing device 1002, and are executed by the one or more processors 1004 of the computing device 1002.

Although embodiments of declarative queries of sensor networks have been described in language specific to structural features and/or methods, it is to be understood that the subject of the appended claims is not necessarily limited to the specific features or methods described. Rather, the specific features and methods are disclosed as exemplary implementations of declarative queries of sensor networks.

What is claimed is:
1. A device comprising:
   a diffraction grating that is adapted to receive light reflected from a surface, wherein the diffraction grating is constructed at least in part of silicon, wherein the diffraction grating is constructed using microelectronic movement (MEMs) technology, and wherein the diffraction grating is responsive to a variable control signal to admit a component of the reflected light through the diffraction grating;

at least one sensor that is adapted to receive the component of the reflected light, and to produce at least one output signal indicating a power level of the component of the reflected light; and at least a further diffraction grating that is adapted to receive incident light, and wherein the further diffraction grating is responsive to a variable control signal to admit a component of the incident light through the further diffraction grating to illuminate the surface.

2. The device of claim 1, further comprising a light source that is adapted to illuminate the surface.

3. The device of claim 1, wherein the diffraction grating is constructed entirely of silicon.

4. The device of claim 1, wherein the diffraction grating is adapted to admit each one of a plurality of respective components of the reflected light in sequence in response to variations of the control signal.

5. The device of claim 1, wherein the diffraction grating is flexible in response to the control signal.

6. The device of claim 1, wherein the diffraction grating is adapted to elongate in response to the control signal.

7. The device of claim 1, wherein the at least one sensor includes a single sensor that is adapted to receive in sequence a plurality of components of the reflected light as the components are admitted sequentially through the diffraction grating.

8. The device of claim 1, wherein the sensor is adapted to measure in sequence a respective power of each one of a plurality of components of the reflected light admitted through the diffraction grating, and wherein the sensor is adapted to produce a plurality of respective output signals in sequence to indicate a power of each of the components.

9. A system including at least the device of claim 1.

10. A method comprising:
admitting in sequence a plurality of respective components of light reflected from a surface;
measuring a respective power level of each component of the admitted light; and
admitting in sequence a plurality of respective components of incident light and illuminating the surface with the respective components of the incident light.

11. The method of claim 10, wherein admitting a plurality of respective components includes varying at least one control signal provided to a diffraction grating.

12. The method of claim 10, further comprising altering at least one physical characteristic of a diffraction grating in response to a control signal.

13. The method of claim 10, further comprising generating signals representing respective power levels of a plurality of components of the admitted light.

14. The method of claim 10, further comprising multiplexing a plurality of respective components of the admitted light sequentially across a single sensor.

15. A method comprising:
providing a diffraction grating that is adapted to receive light reflected from a surface, wherein the diffraction grating is constructed at least in part of silicon, and wherein the diffraction grating is responsive to a control signal to admit respective components of the reflected light in sequence;

placing at least one sensor in optical communication with the diffraction grating to receive the respective components of the reflected light in sequence therefrom; and providing at least a further diffraction grating and placing the further diffraction grating in communication with incident light, wherein the further diffraction grating is responsive to a control signal to admit respective components of the incident light in sequence to illuminate the surface.

16. The method of claim 15, further comprising providing a light source that is adapted to illuminate the surface.

17. The method of claim 16, further comprising packaging at least the diffraction grating, the sensor, and to light source into a compact color measurement device.

* * * * *

UNITED STATES PATENT AND TRADEMARK OFFICE
CERTIFICATE OF CORRECTION

| | | |
|---|---|---|
| PATENT NO. | : 7,426,029 B2 | Page 1 of 1 |
| APPLICATION NO. | : 11/217070 | |
| DATED | : September 16, 2008 | |
| INVENTOR(S) | : Mauzy et al. | |

It is certified that error appears in the above-identified patent and that said Letters Patent is hereby corrected as shown below:

In column 16, line 37, in Claim 17, delete "to" and insert -- the --, therefor.

Signed and Sealed this
Third Day of May, 2011

David J. Kappos
*Director of the United States Patent and Trademark Office*